(12) United States Patent
Kim et al.

(10) Patent No.: US 10,505,384 B2
(45) Date of Patent: Dec. 10, 2019

(54) WIRELESS CHARGING APPARATUS AND METHOD

(71) Applicant: Electronics and Telecommunications Research Institute, Daejeon (KR)

(72) Inventors: Sang Won Kim, Daejeon (KR); Seong Min Kim, Daejeon (KR); Jung Ick Moon, Daejeon (KR); Sang Bong Jeon, Daejeon (KR); In Kui Cho, Daejeon (KR); Je Hoon Yun, Daejeon (KR); Dong Won Jang, Daejeon (KR); Hyung Do Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 80 days.

(21) Appl. No.: 15/428,616

(22) Filed: Feb. 9, 2017

(65) Prior Publication Data
US 2018/0131219 A1 May 10, 2018

(30) Foreign Application Priority Data

Nov. 8, 2016 (KR) .......................... 10-2016-0148328

(51) Int. Cl.
*H02J 7/02* (2016.01)
*H02J 50/10* (2016.01)
*H02J 7/04* (2006.01)
*H02J 50/80* (2016.01)

(52) U.S. Cl.
CPC .............. *H02J 7/025* (2013.01); *H02J 7/045* (2013.01); *H02J 50/10* (2016.02); *H02J 50/80* (2016.02)

(58) Field of Classification Search
CPC .. H02J 7/025; H02J 7/045; H02J 50/10; H02J 50/12; H02J 5/00; H01F 38/14
See application file for complete search history.

(56) References Cited

U.S. PATENT DOCUMENTS

| | | | | |
|---|---|---|---|---|
| 5,376,870 A | * | 12/1994 | Ueda | H02P 6/085 318/400.4 |
| 8,217,645 B2 | * | 7/2012 | Iida | A61B 1/00158 324/207.12 |
| 8,922,066 B2 | | 12/2014 | Kesler et al. | |
| 10,199,853 B2 | * | 2/2019 | Cho | H02J 50/12 |
| 10,256,666 B2 | * | 4/2019 | Jung | H02J 50/12 |
| 2008/0049372 A1 | * | 2/2008 | Loke | H02J 7/025 361/143 |
| 2009/0069869 A1 | * | 3/2009 | Stouffer | A61N 1/37223 607/61 |

(Continued)

FOREIGN PATENT DOCUMENTS

| KR | 10-2009-0098239 | 9/2009 |
|---|---|---|
| KR | 10-2016-0018006 | 2/2016 |

*Primary Examiner* — Helen Rossoshek
(74) *Attorney, Agent, or Firm* — Kile Park Reed & Houtteman PLLC

(57) ABSTRACT

Disclosed is a wireless charging apparatus and method, the apparatus including a controller configured to control the wireless charging apparatus, and a transmitter configured to form a rotating magnetic field in a three-dimensional (3D) space in response to a first clock signal and a second clock signal generated under a control of the controller, wherein a phase difference between the first clock signal and the second clock signal is 90 degrees.

17 Claims, 15 Drawing Sheets

(56) References Cited

U.S. PATENT DOCUMENTS

| | | | | |
|---|---|---|---|---|
| 2011/0127953 A1* | 6/2011 | Walley | ............... | G06K 7/10207 320/108 |
| 2011/0181273 A1* | 7/2011 | Iida | ................... | A61B 1/00158 324/207.11 |
| 2012/0313645 A1* | 12/2012 | Biber | ................ | G01R 33/3692 324/322 |
| 2014/0197691 A1* | 7/2014 | Wang | ...................... | H01F 38/14 307/104 |
| 2014/0206384 A1 | 7/2014 | Kim et al. | | |
| 2015/0022147 A1* | 1/2015 | Jung | ....................... | H02J 5/005 320/108 |
| 2015/0022194 A1* | 1/2015 | Almalki | ............. | G01R 33/02 324/244 |
| 2015/0180267 A1* | 6/2015 | Romanelli | ............ | A01K 1/031 320/108 |
| 2015/0354980 A1* | 12/2015 | Wahdan | ................ | G01C 17/38 324/202 |
| 2015/0372493 A1* | 12/2015 | Sankar | .................... | H02J 7/025 307/104 |
| 2016/0064994 A1* | 3/2016 | Ku | ......................... | H02J 7/025 307/104 |
| 2016/0118806 A1* | 4/2016 | Standke | ............... | H01F 38/14 307/104 |
| 2016/0380469 A1* | 12/2016 | Lethellier | ............... | H02J 7/025 320/108 |
| 2017/0040826 A1* | 2/2017 | Arendarik | ............... | H02J 50/10 |
| 2017/0047786 A1* | 2/2017 | Park | ......................... | H02J 7/02 |
| 2017/0126063 A1* | 5/2017 | Pan | ........................ | H02M 3/335 |
| 2017/0179754 A1* | 6/2017 | Cho | ...................... | H02J 50/12 |
| 2017/0222483 A1* | 8/2017 | Feng | ..................... | H02J 50/12 |
| 2018/0040954 A1* | 2/2018 | Richardson | ............ | H01Q 1/241 |
| 2018/0062442 A1* | 3/2018 | Qiu | ........................ | H02J 50/12 |
| 2018/0262050 A1* | 9/2018 | Yankowitz | ............ | H01F 38/14 |
| 2018/0287435 A1* | 10/2018 | Wilson | ................... | H02J 50/90 |
| 2018/0342896 A1* | 11/2018 | Zhang | .................... | H02J 50/23 |
| 2019/0165600 A1* | 5/2019 | Cho | ...................... | H02J 50/12 |

* cited by examiner

130

130

WIRELESS CHARGING APPARATUS AND METHOD

CROSS-REFERENCE TO RELATED APPLICATION(S)

This application claims the priority benefit of Korean Patent Application No. 10-2016-0148328 filed on Nov. 8, 2016, in the Korean Intellectual Property Office, the disclosure of which is incorporated herein by reference for all purposes.

BACKGROUND

1. Field

One or more example embodiments relate to wireless charging apparatus and method.

2. Description of Related Art

To obtain high transmission efficiency in wireless power transmission in a wireless power system, a distance between a transmitting resonator, for example, a coil and a receiving resonator and a receiver load resistance may need to satisfy a predetermined condition.

In addition to such constraint, efficiency of a general wireless power system may be dependent on an orientation of a resonator. In the wireless power system, high efficiency may occur when the transmitting resonator faces the receiving resonator. When the transmitting resonator is fixed, an amount of charging may vary in response to the receiving resonator rotating by 45 degrees (°) or 90°.

Magnetic resonance technology-based wireless power transmission may employ an in-phase dual-feed scheme. At present, the magnetic resonance technology-based wireless power transmission may ensure transmission performed in a medium distance of about one meter, and wireless charging may be performed while the transmitting resonator and the receiving resonator face each other.

SUMMARY

According to an aspect, there is provided a wireless charging apparatus including a controller configured to control the wireless charging apparatus, and a transmitter configured to form a rotating magnetic field in a three-dimensional (3D) space in response to a first clock signal and a second clock signal generated under a control of the controller, wherein a phase difference between the first clock signal and the second clock signal is 90 degrees.

The transmitter may include a plurality of coils, a first inverter configured to supply currents to first coils among the plurality of coils in response to the first clock signal and a reversed first clock signal, and a second inverter configured to supply currents to second coils among the plurality of coils in response to the second clock signal and a reversed second clock signal.

The first coils may be arranged in a first direction in parallel and the second coils may be arranged in a second direction in parallel.

The transmitter may further include a phase reverser configured to reverse a phase of the first clock signal and a phase of the second clock signal.

The wireless charging apparatus may further include a clock signal generator configured to generate the first clock signal and the second clock signal.

The transmitter may further include a third inverter configured to supply a current to a third coil among the plurality of coils in response to a third clock signal, and the third coil may be disposed on a bottom face of the wireless charging apparatus.

The controller may be configured to adjust a duty ratio between the first clock signal and the second clock signal based on a quiescent current.

The controller may be configured to control a buck converter to adjust input power of the transmitter based on a quiescent current.

The controller may be configured to control a clock frequency of the clock signal generator based on a quiescent current.

The wireless charging apparatus may further include a supervisor configured to monitor the quiescent current.

According to another aspect, there is also provided a wireless charging method performed by a wireless charging apparatus, the method including receiving a first clock signal and a second clock signal and forming a rotating magnetic field in a 3D space in response to the first clock signal and the second clock signal, wherein a phase difference between the first clock signal and the second clock signal is 90 degrees.

The forming may include supplying currents to first coils of the wireless charging apparatus in response to the first clock signal and a reversed first clock signal, and supplying currents to second coils of the wireless charging apparatus in response to the second clock signal and a reversed second clock signal.

The first coils may be arranged in a first direction in parallel and the second coils may be arranged in a second direction in parallel.

The forming may further include supplying a current to a third coil of the wireless charging apparatus in response to a third clock signal, and the third coil may be disposed on a bottom face of the wireless charging apparatus.

The first coils and the second coils may be arranged on a wall of the wireless charging apparatus.

The wireless charging method may further include controlling frequencies of the first clock signal and the second clock signal based on a quiescent current.

The wireless charging method may further include adjusting a duty ratio between the first clock signal and the second clock signal based on a quiescent current.

The wireless charging method may further include adjusting an input power input to the wireless charging apparatus based on a quiescent current.

The wireless charging method may further include monitoring the quiescent current.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
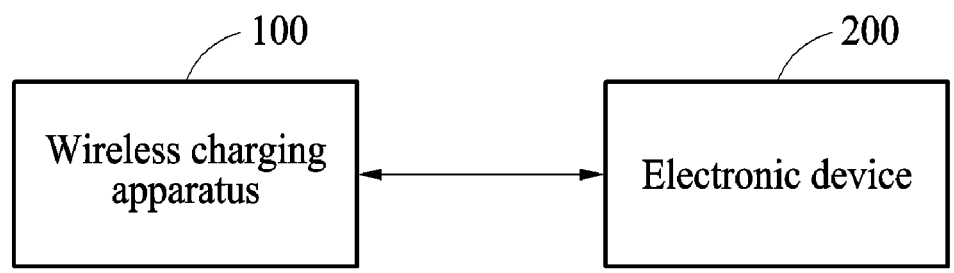
FIG. 1 is a block diagram illustrating a wireless charging system according to an example embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art.

Various alterations and modifications may be made to the examples. Here, the examples are not construed as limited to the disclosure and should be understood to include all changes, equivalents, and replacements within the idea and the technical scope of the disclosure.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the terms "a," "an," and "the" are intended to include the plural forms as well, unless the context clearly indicates otherwise. As used herein, the terms "include, "comprise," and "have" specify the presence of stated features, numbers, operations, elements, components, and/or combinations thereof, but do not preclude the presence or addition of one or more other features, numbers, operations, elements, components, and/or combinations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, some example embodiments will be described with reference to the accompanying drawings. It should be understood, however, that there is no intent to limit this disclosure to the particular example embodiments disclosed. Like numbers refer to like elements throughout the description of the figures.

Figure 2:
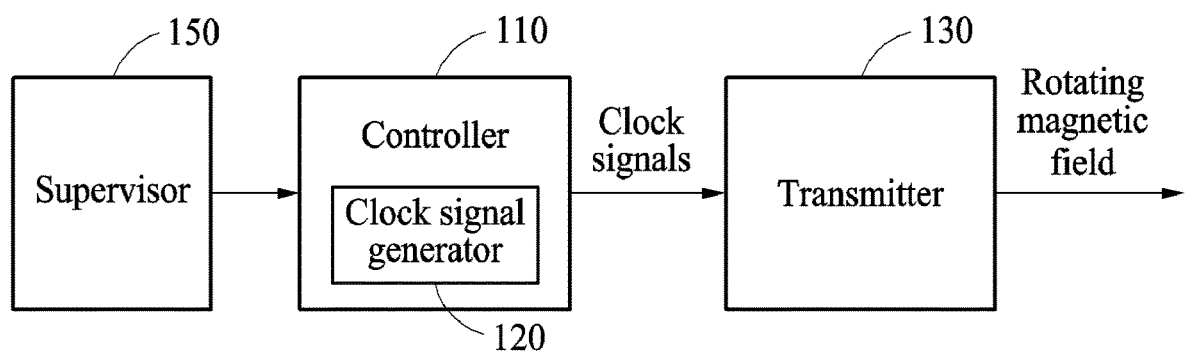
FIG. 2 is a block diagram illustrating a wireless charging apparatus of FIG. 1.

FIG. 1 is a block diagram illustrating a wireless charging system according to an example embodiment, and FIG. 2 is a block diagram illustrating a wireless charging apparatus of FIG. 1.

Referring to FIGS. 1 and 2, a wireless charging system 10 may include a wireless charging apparatus 100 and an electronic device 200.

The wireless charging apparatus 100 may be located in a three-dimensional (3D) wireless charging space to wirelessly charge the electronic device 200 that is also located in the 3D wireless charging space. The wireless charging apparatus 100 may form a magnetic field, for example, a rotating magnetic field to charge the electronic device 200.

The electronic device 200 may be, for example, a personal computer (PC), a data server, a pad, a medical instrument, an electric vehicle, and a portable electronic device The portable electronic device may be implemented as, for example a laptop computer, a mobile phone, a smartphone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), a handheld console, an e-book, and a smart device. The smart device may be implemented to be, for example, a smart watch and a smart band.

The wireless charging apparatus 100 may form an energy zone for wireless charging in the 3D wireless charging space. For example, the wireless charging apparatus 100 may form a rotating magnetic field using coils of a transmitter 130 located in a wireless charging space. In this example, the wireless charging space may be formed to be an energy zone based on the rotating magnetic field.

The wireless charging apparatus 100 may include a controller 110, a transmitter 130, and a supervisor 150.

The controller 110 may control the wireless charging apparatus 100 overall. For example, the controller 110 may control an operation of the transmitter 130.

The controller 110 may include a clock signal generator 120. Although FIG. 2 illustrates that the clock signal generator 120 is included in the controller 110, the clock signal generator 120 may also be disposed external to the controller 110 depending on examples.

The clock signal generator 120 may generate a clock signal in response to a control of the controller 110. For example, the clock signal generator 120 may use one of a digital signal processor (DSP), a microcontroller, or a plurality of D latches. The clock signal generator 120 may be implemented as one of the DSP, the microcontroller, and the plurality of D latches.

The clock signal may include a plurality of clock signals, for example, a first clock signal and a second clock signal. The clock signal generator 120 may generate the first clock signal and set a phase of the first clock signal to be zero degrees)(°. Also, the clock signal generator 120 may generate the second clock signal and set a phase of the second clock signal to be 90°. The clock signal may also include a reversed signal of the first clock signal and a reversed signal of the second clock signal.

The transmitter 130 may form a rotating magnetic field on a wall of a 3D space in response to the first clock signal and the second clock signal.

The wireless charging apparatus 100 may set a phase difference between the first clock signal and the second clock signal transmitted to the transmitter 130 to be 90° and form a uniform magnetic field, for example, a uniform rotating magnetic field in a wireless charging space using coils of the transmitter 130. The electronic device 200 may acquire an equalized charging efficiency through the uniform rotating magnetic field irrespective of a location in the wireless charging space. The equalized rotating magnetic field may satisfy Equation 1.

$$\sin x - \sin(x-90°) = \sqrt{2} \sin(x-45°) \quad \text{[Equation 1]}$$

In Equation 1, sin x is a term that corresponds to the first clock signal, and sin(x−90°) is a term that corresponds to the second clock signal. For example, the wireless charging apparatus 100 may remove a null point at which a charging efficiency is zero, and acquire 1.414 times gain. The charging efficiency may indicate a direct current (DC)-to-DC efficiency.

Also, the clock signal generator 120 may generate a third clock signal. The transmitter 130 may form an additional magnetic field on a bottom face of the 3D space or the wireless charging space through the coils of the transmitter 130 corresponding to the bottom face of the 3D space in response to the third clock signal. For example, the third clock signal may be irrespective of the phases of the first clock signal and the second clock signal.

The wireless charging apparatus 100 may generate the first clock signal, the second clock signal, and the third clock signal and transmit the first clock signal, the second clock signal, and the third clock signal and transmit to the transmitter 130. Through this, the wireless charging apparatus 100 may efficiently charge the electronic device 200 using the uniform magnetic field generated by the coils of the transmitter 130 in the 3D space.

The supervisor 150 may monitor a quiescent current, for example, a quiescent current of the wireless charging apparatus 100. The supervisor 150 may transmit information on the monitored quiescent current to the controller 110.

The controller 110 may adjust a magnitude of quiescent current based on information on the quiescent current. For example, the controller 110 may adjust the magnitude of quiescent current by adjusting an intensity of rotating magnetic field. The magnitude of quiescent current may vary based on the intensity of rotating magnetic field, and the intensity of rotating magnetic field may vary based on an amount of input power.

The controller 110 may adjust the magnitude of the quiescent current by adjusting the amount of input power. When the amount of the input power is relatively large, the intensity of rotating magnetic field may be high. Conversely, when the amount of input power is relatively small, the intensity of the rotating magnetic field may be low. The input power may be a DC power.

In this example, the controller 110 may adjust the amount of input power using a buck converter. The buck converter may adjust the amount of input power input to the transmitter 130 under a control of the controller 110. For example, when the amount of input power input to the transmitter 130 decreases, the intensity of rotating magnetic field may decrease and thus, the magnitude of quiescent current may also decrease. The wireless charging apparatus 100 may further include the buck converter.

The controller 110 may adjust the magnitude of quiescent current by adjusting a duty ratio of a clock signal. The duty ratio of the clock signal may indicate a ratio of the time in which a signal is present or the time in which the signal flows to the signal of one period. For example, when the controller 110 reduces the duty ratio of the clock signal, the intensity of rotating magnetic field may decrease, and thus, the magnitude of quiescent current may also decrease.

The controller 110 may adjust the magnitude of quiescent current by controlling a the clock signal generator 120, for example, a frequency of a clock signal.

The controller 110 may adjust the intensity of rotating magnetic field in the following cases.

In a case in which the wireless charging apparatus 100 does not perform charging, the controller 110 may reduce the intensity of rotating magnetic field. Through this, the wireless charging apparatus 100 may be prevented from waste of energy.

In a case in which a foreign substance exists in the wireless charging space, the controller 110 may reduce the intensity of the rotating magnetic field. When a foreign substance such as a metal exists in the wireless charging space, the quiescent current may cause the foreign substance to generate heat and the wireless charging system 10 may be destabilized.

In a case in which the electronic device 200 is absent in the wireless charging space, the controller 110 may reduce the intensity of the rotating magnetic field. The controller 110 may verify whether the electronic device 200 or a receiving coil is present in the wireless charging space. For example, the controller 110 may sense an electronic device including the receiving coil, for example, the electronic device 200 in the wireless charging space using location-based communication technology. The location-based communication technology may include, for example, near-field communication (NFC), Bluetooth, and wireless fidelity (Wi-Fi).

The controller 110 may detect an inductive current received by the electronic device 200. For example, the controller 110 may detect an inductive current formed on a receiving coil of the electronic device 200 based on a coil of the transmitter 130 inductively coupled with the receiving coil of the electronic device 200. Since the coil of the transmitter 130 is inductively coupled with the receiving coil of the electronic device 200, the controller 110 may detect the inductive current based on a relational expression between the coil of the transmitter 130 and the receiving coil of the electronic device 200.

The inductive current formed on the receiving coil of the electronic device 200 may be a current induced by a rotating magnetic field formed on the transmitter 130. Also, the inductive current may exhibit different current values in response to a positional change of the electronic device 200.

The controller 110 may change a phase of a current supplied to the coil of the transmitter 130 based on the detected inductive current of the receiving coil. In response to the phase of the current being changed, a phase of a current induced to the receiving coil may also be changed.

The controller 110 may re-detect a phase-changed inductive current that is induced to the receiving coil. When the re-detected inductive current is in a normal state, the controller 110 may continually perform the charging of the electronic device 200 while maintaining the phase of the current. For example, the controller 110 may supply the current having different phases based on a position of the receiving coil in the wireless charging space to a transmitting coil of the transmitter 130 and perform the charging without restrictions on a location in the wireless charging space.

Wireless charging technology using the wireless charging apparatus 100 is also applicable to various electronic devices, for example, a pad-type electronic device such as a smartphone, and exerts influence on activations of a wearable device and an Internet of things (IoT) device. Also, the wireless charging technology using the wireless charging apparatus 100 may provide ease of use by carrying out charging in a desired space freely with respect to small-sized wearable devices with are difficult to be wired and replace batteries.

Figure 3:
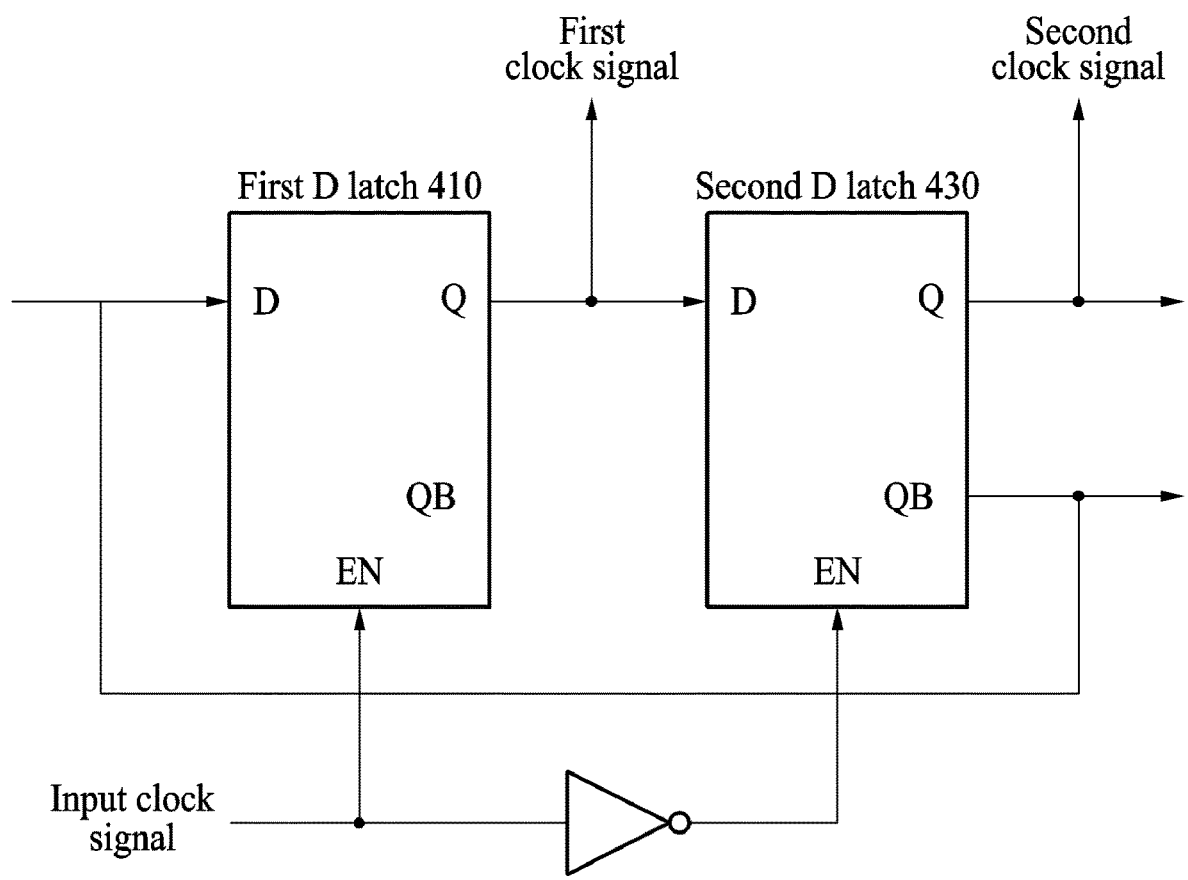
FIG. 3 is a circuit diagram illustrating a clock signal generator of FIG. 2.
Figure 4:
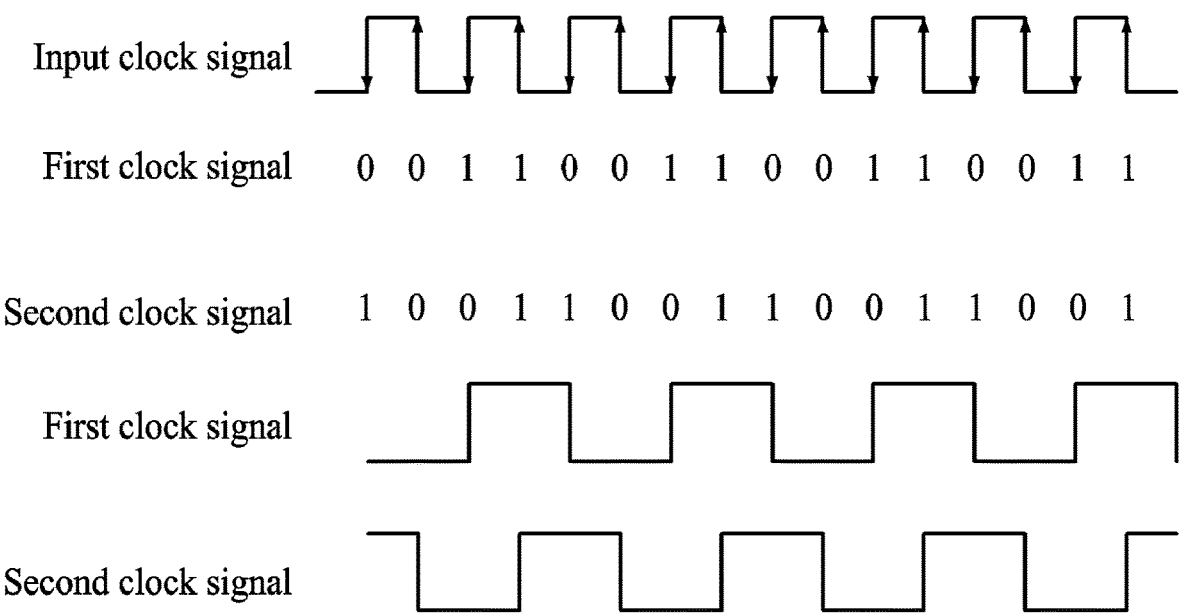
FIG. 4 is a diagram illustrating clock signals generated by a D latch of FIG. 3.
Figure 5:
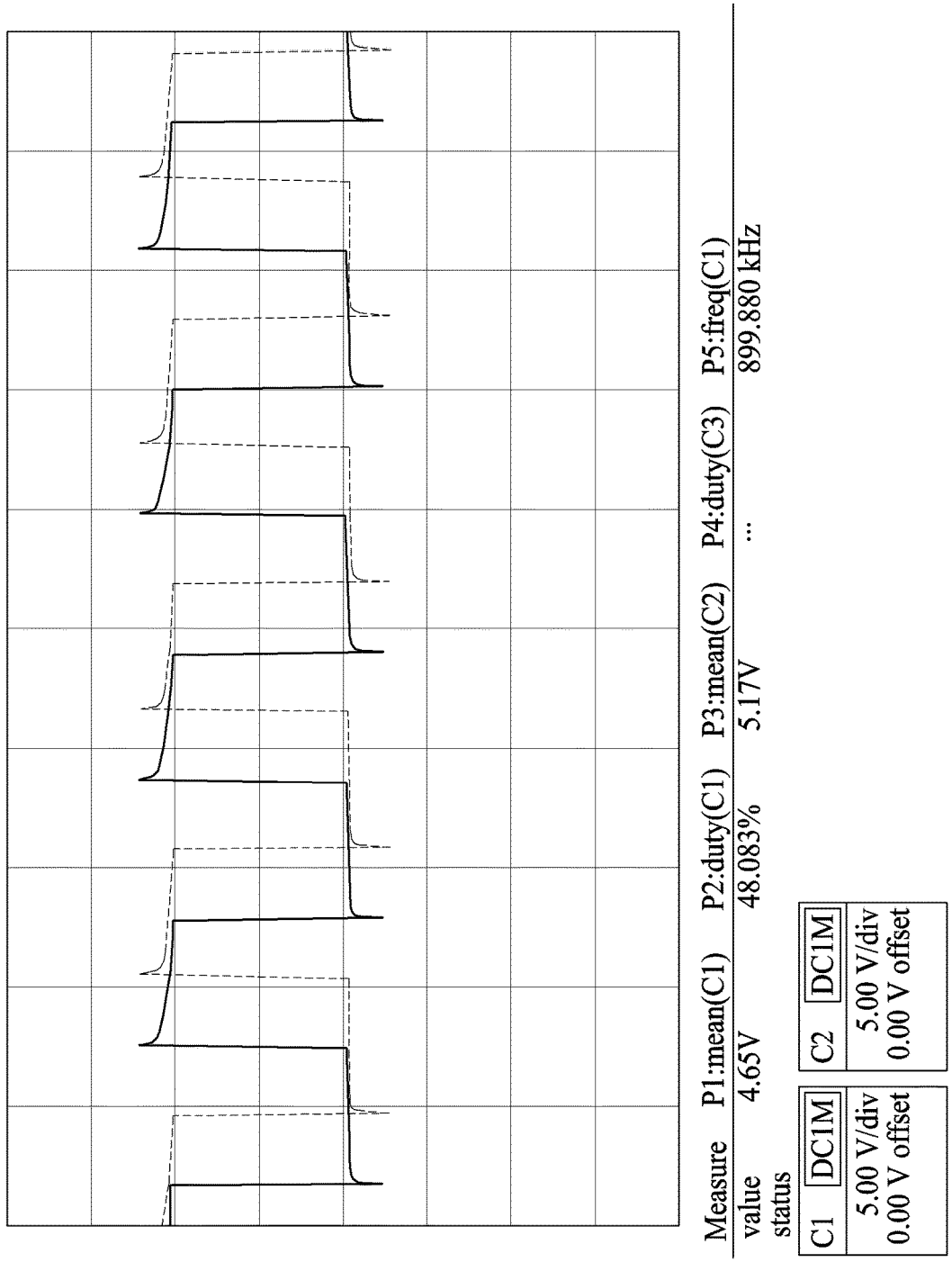
FIG. 5 illustrates an example of a clock signal generated by actually implementing the D latch of FIG. 3.

FIG. 3 is a circuit diagram illustrating a clock signal generator of FIG. 2, FIG. 4 is a diagram illustrating clock signals generated by a D latch of FIG. 3, and FIG. 5 illustrates an example of a clock signal generated by actually implementing the D latch of FIG. 3

Referring to FIGS. 3 through 5, the clock signal generator 120 may include a plurality of D latches, for example, a first D latch 410 and a second D latch 430. The clock signal generator 120 may use the plurality of D latches to generate clock signals between which a phase difference is 90°.

The first D latch 410 may output a first clock signal based on an input clock signal. The second D latch 430 may output a second clock signal based on a reversed input clock signal. A phase difference between the first clock signal and the second clock signal may be 90°.

In this example, a frequency of the input clock signal may be twice a frequency of the first clock signal and a frequency of the second clock signal, respectively. For example, if the respective frequencies of the first clock signal and the second clock signal is 140 kilohertz (kHz), the frequency of the input clock signal may be 280 kHz.

The input clock signal, the first clock signal, and the second clock signal may be as shown in FIG. 4. In FIG. 4, the frequency of the input clock signal is twice the respective frequencies of the first clock signal and the second clock signal, and the phase difference between the first clock signal and the second clock signal is 90°.

In practice, a result of the clock signal generator 120 generating the first clock signal and the second clock signal using the plurality of D latches may be as shown in FIG. 5.

Although FIGS. 3 through 5 illustrate the clock signal generator 120 using the plurality of D latches including the first D latch 410 and the second D latch 430 to generate the clock signals having the phase difference of 90°, embodiments are not limited thereto. Depending on examples, the clock signal generator 120 may generate reversed signals of the clock signals using the plurality of D latches as well as the clock signal.

Figure 6A:
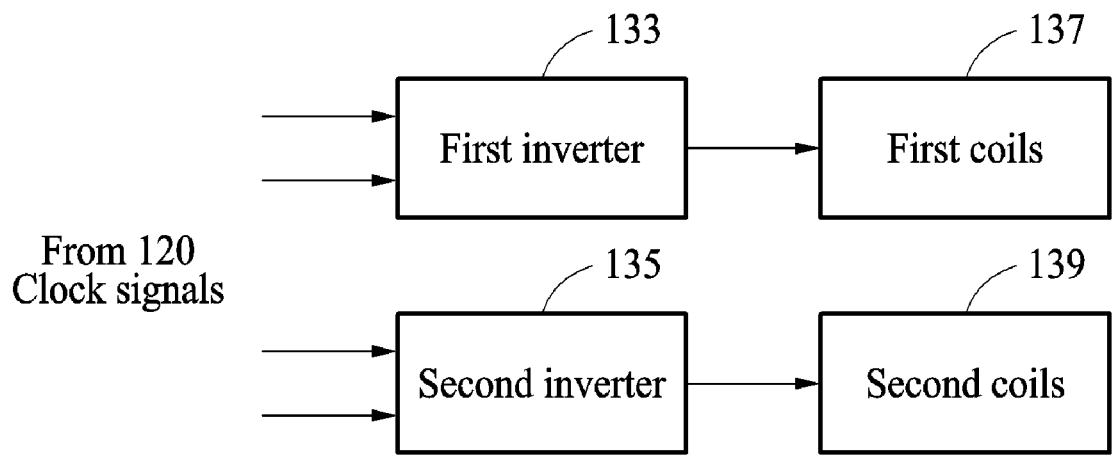
FIGS. 6A and 6B are diagrams illustrating examples of a transmitter of FIG. 2.

FIG. 6A is a diagram illustrating an example of a transmitter of FIG. 2.

Referring to FIG. 6A, the transmitter 130 may include a plurality of inverters and a plurality of coils including, for example, first coils 137 and second coils 139.

The transmitter 130 may receive clock signals output from the clock signal generator 120. The clock signals may include a first clock signal and a second clock signal, and a phase difference between the first clock signal and the second clock signal may be 90°. The clock signal may also include a reversed first clock signal and a reversed second clock signal.

The plurality of inverters may include a first inverter 133 and a second inverter 135. A configuration and an operation of the first inverter 133 may be substantially the same as those of the second inverter 135.

The first inverter 133 may supply a current to the first coils 137 in response to the first clock signal and the reversed first clock signal. In this example, the first inverter 133 may feed or supply the current to the first coils 137 using a direct feeding method or an indirect feeding method. The direct feeding method may be a method in which the first inverter 133 directly feeds the first coils 137. The indirect feeding method may be a method in which the wireless charging apparatus 100 additionally includes a feeding coil and the first inverter 133 indirectly feeds the first coils 137.

The second inverter 135 may supply a current to the second coils 139 in response to the second clock signal and the reversed second clock signal. In this example, the second inverter 135 may feed or supply the current to the second coils 139 using the direct feeding method or the indirect feeding method.

The currents supplied to the first coils 137 and the second coils 139 may flow in the same direction. For example, the clock signal generator 120 may supply the currents to the first coils 137 and the second coils 139 in the same direction and form a uniform rotating magnetic field in a wireless charging space. Through this, a magnetic field having a uniform energy density may be formed in the wireless charging space. Also, coils of the transmitter 130 may provide an equal inductive current to a receiving coil irrespective of a location of the electronic device 200.

Figure 6B:
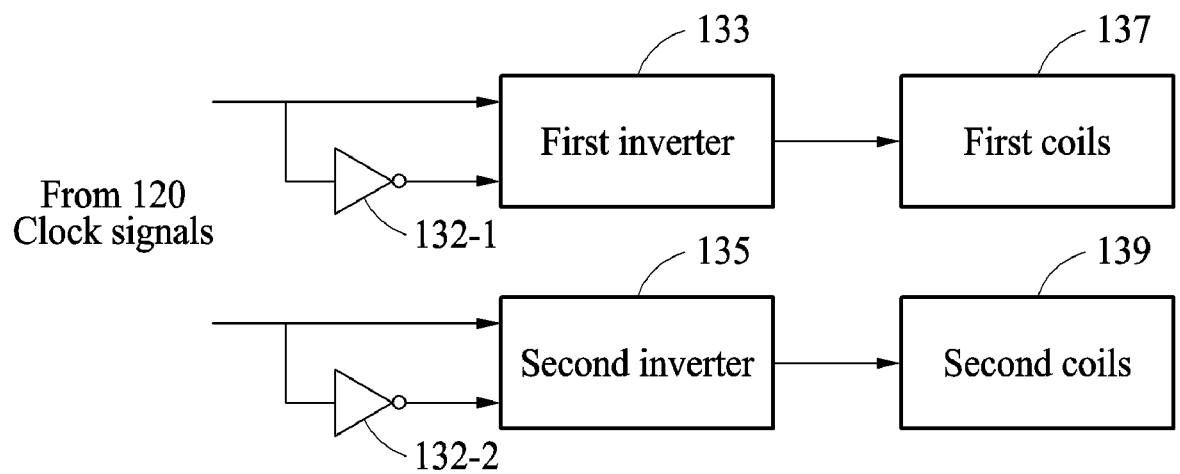

FIG. 6B is a diagram illustrating another examples of a transmitter of FIG. 2.

Referring to FIG. 6B, the transmitter 130 may include s plurality of phase reversers, a plurality of inverters including, for example, the first inverter 133 and the second inverter 135, and a plurality of coils including, for example, the first coils 137 and the second coils 139. The plurality of phase reversers may include a first phase reverser 132-1 and a second phase reverser 132-2.

The transmitter 130 may receive clock signals output from the clock signal generator 120. The clock signals may include a first clock signal and a second clock signal, and a phase difference between the first clock signal and the second clock signal may be 90°.

In response to the first clock signal, the first phase reverser 132-1 may generate a reversed first clock signal. In response to the second clock signal, the second phase reverser 132-2 may generate a reversed second clock signal.

Configurations and operations of the plurality of inverters and the plurality of coils of FIG. 6B may be substantially the same as those of the plurality of inverters and the plurality of coils described with reference to FIG. 6A. Since the descriptions of FIG. 6A are also applicable here, repeated descriptions of FIG. 6B will be omitted.

Figure 7A:
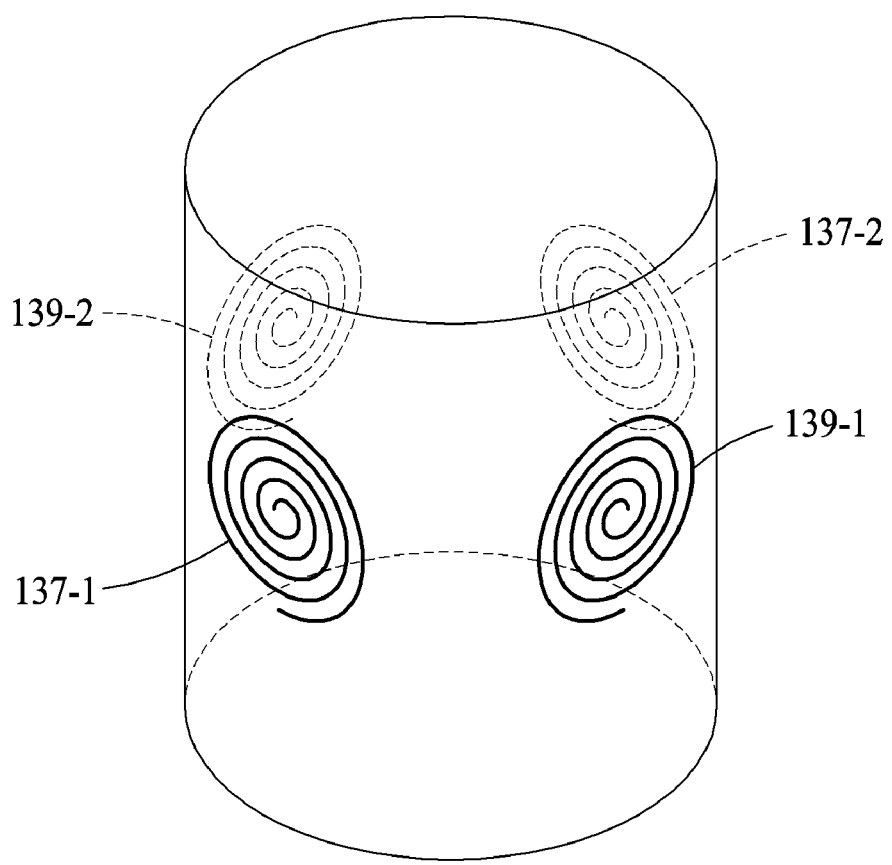
FIG. 7A is a diagram illustrating an example of arranging first coils and second coils of FIG. 6A or FIG. 6B in a wireless charging apparatus.

FIG. 7A is a diagram illustrating an example of arranging first coils and second coils of FIG. 6A or FIG. 6B in a wireless charging apparatus.

FIG. 7A illustrates an example in which first coils and second coils of FIG. 6A or FIG. 6B are arranged in a wireless charging apparatus.

Referring to FIG. 7A, first coils 137-1 and 137-2 and second coils 139-1 and 139-2 may include at least a pair of coils.

The first coils 137-1 and 137-2 and the second coils 139-1 and 139-2 may be provided in a hexagonal structure. The first coils 137-1 and 137-2 and the second coils 139-1 and 139-2 may be arranged on walls of the hexagonal structure.

The first coils 137-1 and 137-2 may be arranged in a first direction in parallel. For example, the first coils 137-1 and 137-2 may each be a pair of coils facing each other.

The second coils 139-1 and 139-2 may be arranged in a second direction in parallel. For example, the second coils 139-1 and 139-2 may each be a pair of coils facing each other.

In this example, an included angle between the first direction and the second direction may be 90°.

Figure 7B:
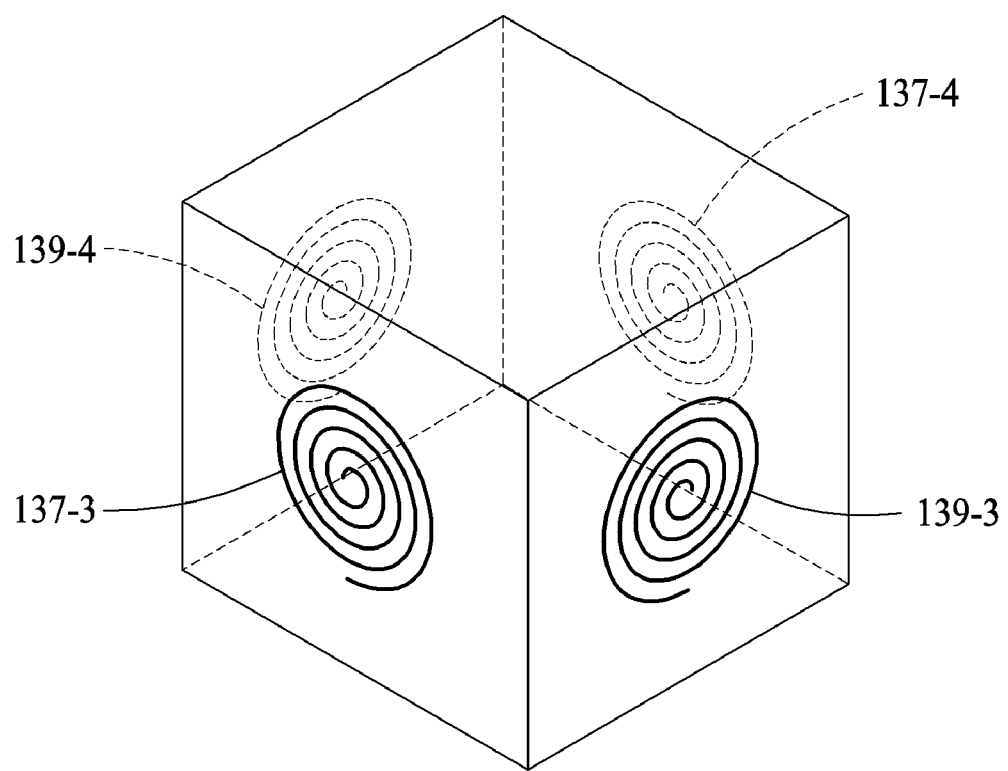
FIG. 7B is a diagram illustrating another example of arranging first coils and the second coils of FIG. 6A or FIG. 6B in a wireless charging apparatus.

FIG. 7B illustrates another example in which first coils and second coils of FIG. 6A or FIG. 6B are arranged in a wireless charging apparatus.

Referring to FIG. 7B, first coils 137-3 and 137-4 and second coils 139-3 and 139-4 may include at least a pair of coils.

The first coils 137-3 and 137-4 and the second coils 139-3 and 139-4 may be provided in a cylindrical structure. The first coils 137-3 and 137-4 and the second coils 139-3 and 139-4 may be arranged on a wall of the cylindrical structure.

The first coils 137-3 and 137-4 may be arranged in a first direction in parallel. For example, the first coils 137-3 and 137-4 may each be a pair of coils facing each other.

The second coils 139-3 and 139-4 may be arranged in a second direction in parallel. For example, the second coils 139-3 and 139-4 may each be a pair of coils facing each other.

In this example, an included angle between the first direction and the second direction may be 90°.

Although FIGS. 7A and 7B illustrate the first coils 137-1 through 137-4 and the second coils 139-1 through 139-4 are arranged on a wall of a structure, for example, the wireless charging apparatus 100, embodiments are not limited thereto. The first coils 137-1 through 137-4 and the second coils 139-1 through 139-4 may also be arranged at various positions, for example, a ceiling, a bottom, a corner, or an edge.

Although FIGS. 7A and 7B also illustrate each of the first coils 137-1 through 137-4 and the second coils 139-1 through 139-4 includes a pair of coils, embodiments are not limited thereto. Each of the first coils 137-1 through 137-4 and the second coils 139-1 through 139-4 may include at least a pair of coils.

When each of the first coils 137-1 through 137-4 and the second coils 139-1 through 139-4 includes two pairs of coils, two pairs of first coils may be arranged in the first direction in parallel such that each of the two pairs of first coils faces each other. Similarly, two pairs of second coils may be arranged in the second direction in parallel such that each of the two pairs of second coils faces each other.

Based on the aforementioned configuration, the wireless charging apparatus 100 may efficiently charge the electronic device 200 in a case in which an area of the wireless charging space is relatively large or in a case in which a relatively strong inductive current is required.

Figure 8A:
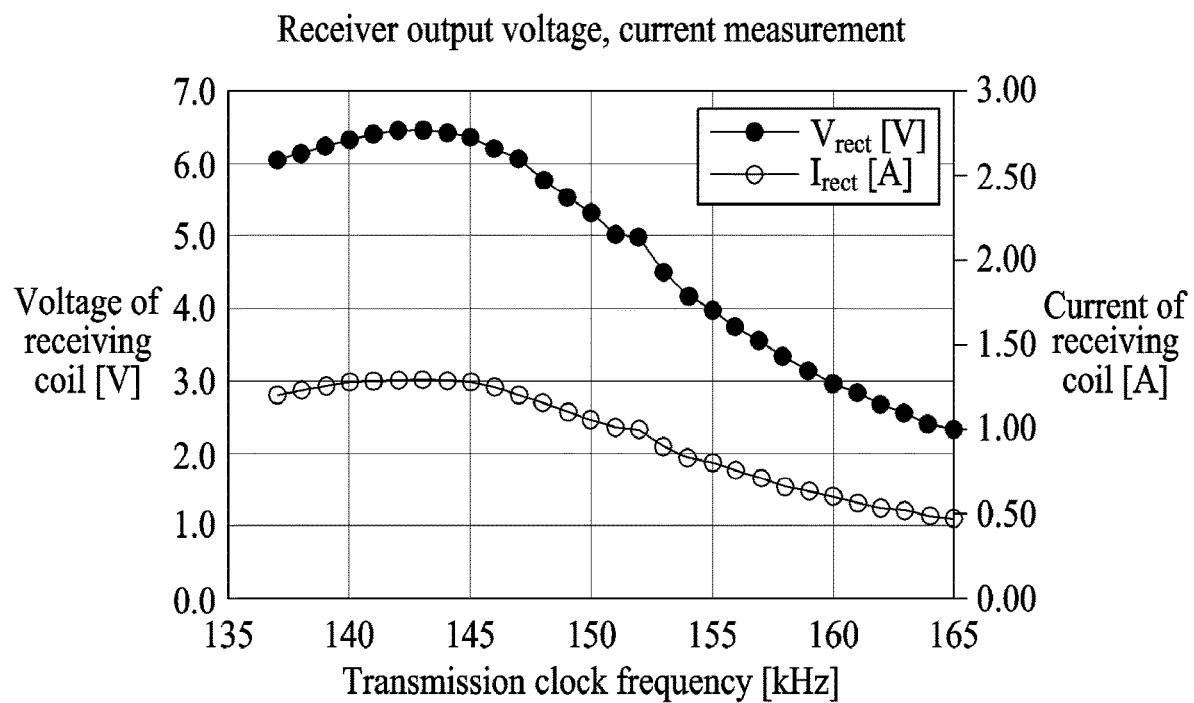
FIG. 8A is a diagram illustrating an example of a current and a voltage of a receiving coil based on a frequency of a clock signal.
Figure 8B:
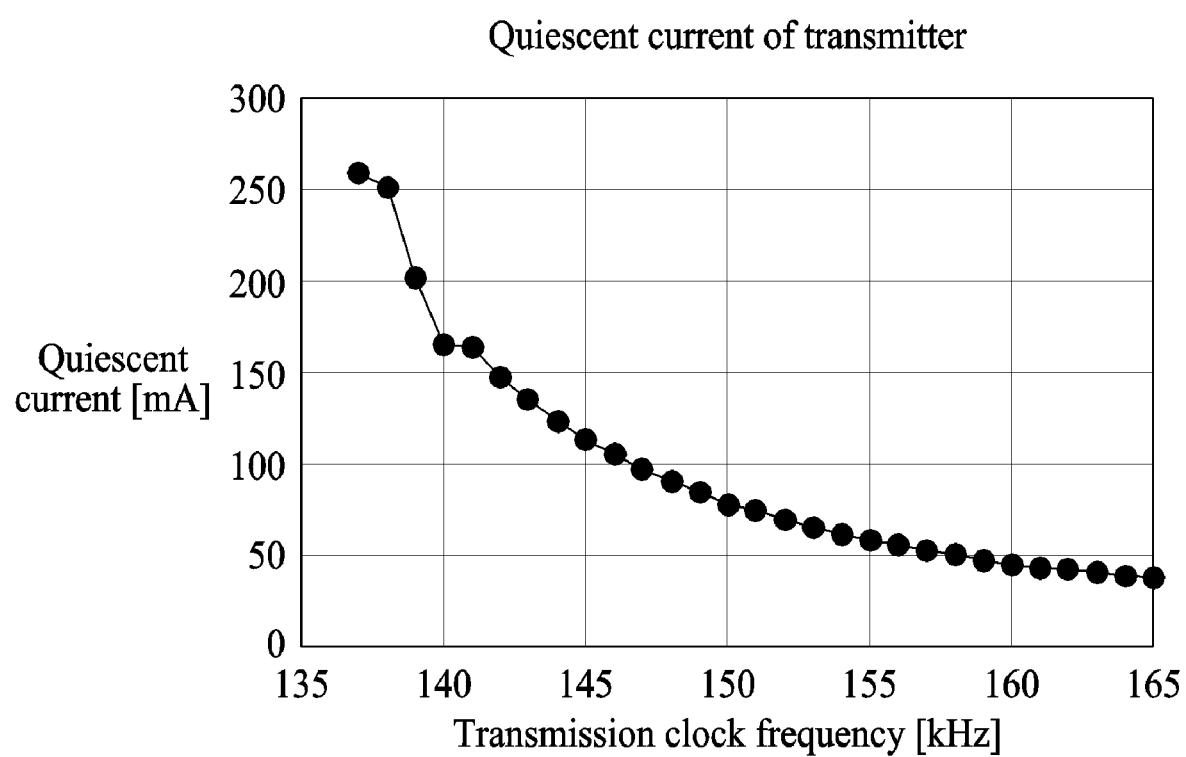
FIG. 8B is a diagram illustrating an example of a quiescent current based on a frequency of a clock signal.

FIG. 8A is a diagram illustrating an example of a current and a voltage of a receiving coil based on a frequency of a clock signal, and FIG. 8B is a diagram illustrating an example of a quiescent current based on a frequency of a clock signal.

Referring to FIGS. 8A and 8B, in response to the controller 110 adjusting a frequency of a clock signal based on information on a quiescent current transmitted by the supervisor 150, a voltage and a current of the electronic device 200 and the quiescent current may vary as shown in Table 1.

TABLE 1

| Transmitting board quiescent current | | | |
|---|---|---|---|
| Frequency (KHz) | Quiescent current [mA] | Vrect [V] | Irect [A] |
| 137 | 259 | 6.08 | 1.21 |
| 138 | 251 | 6.16 | 1.23 |
| 139 | 201 | 6.26 | 1.25 |
| 140 | 165 | 6.35 | 1.28 |
| 141 | 163 | 6.43 | 1.28 |
| 142 | 147 | 6.48 | 1.29 |
| 143 | 135 | 6.48 | 1.29 |
| 144 | 123 | 6.45 | 1.29 |
| 145 | 113 | 6.38 | 1.28 |
| 146 | 105 | 6.23 | 1.25 |
| 147 | 97 | 6.08 | 1.21 |
| 148 | 90 | 5.80 | 1.16 |
| 149 | 84 | 5.55 | 1.11 |
| 150 | 77 | 5.33 | 1.06 |
| 151 | 74 | 5.04 | 1.01 |
| 152 | 69 | 5.00 | 1.00 |
| 153 | 65 | 4.52 | 0.90 |
| 154 | 61 | 4.19 | 0.83 |
| 155 | 58 | 3.99 | 0.80 |
| 156 | 55 | 3.76 | 0.75 |
| 157 | 52 | 3.56 | 0.71 |
| 158 | 50 | 3.34 | 0.66 |
| 159 | 47 | 3.14 | 0.63 |
| 160 | 45 | 2.96 | 0.60 |
| 161 | 43 | 2.84 | 0.56 |
| 162 | 42 | 2.68 | 0.53 |
| 163 | 40 | 2.58 | 0.51 |
| 164 | 38 | 2.42 | 0.48 |
| 165 | 37 | 2.33 | 0.47 |

In Table 1, when the frequency of the clock signal is 140 kHz, the quiescent current is 165 milliamperes (mA). Also, when the frequency of the clock signal is 155 kHz, the quiescent current is 58 mA. In this example, a load resistance of the electronic device 200 may be 5 ohms, and a voltage of an input power of the transmitter 130 may be 12 volts (V). When the frequency of the clock signal is 155 kHz, a voltage applied to the electronic device 200 may be about 4 V and thus, a Bluetooth low energy (BLE) communication is to be performed. To perform the BLE communication, at least a voltage of 3.3 V may be provided to the electronic device 200.

A graph of FIG. 8A represents the voltage and the current of the electronic device 200 of Table 1, and a graph of FIG. 8B represents the quiescent current of Table 1. In the graphs, it is shown that the voltage and the current of the electronic device 200 and the quiescent current decrease in an interval corresponding to the frequency of the clock signal being equal to or greater than 1404 hertz (Hz).

Figure 9:
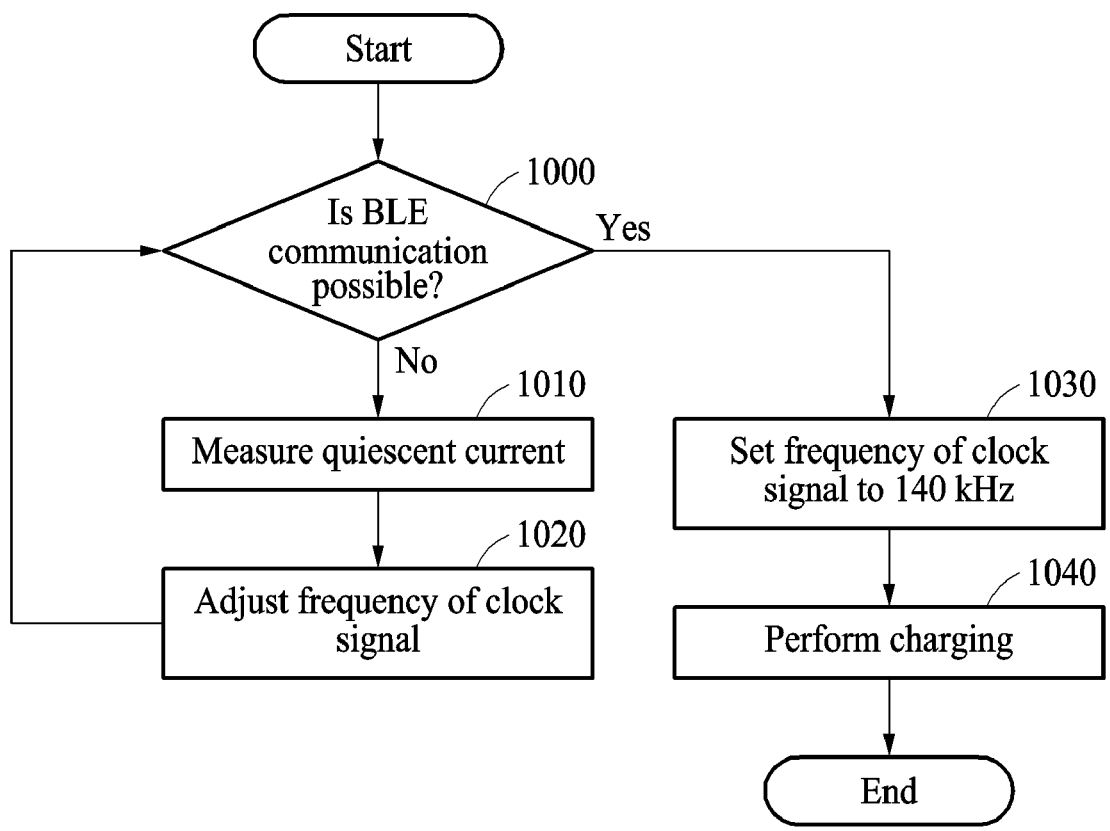
FIG. 9 is a flowchart illustrating an operation of a wireless charging apparatus reducing a quiescent current in according to an example embodiment.

FIG. 9 is a flowchart illustrating an operation of a wireless charging apparatus reducing a quiescent current in according to an example embodiment.

Referring to FIG. 9, in operation 1000, the controller 110 may determine whether a BLE communication with the electronic device 200 is possible. For example, the controller 110 may periodically attempt the BLE communication through a beacon to verify whether the electronic device 200 is present in a wireless charging space.

When the BLE communication is impossible, the controller 110 may measure or monitor a quiescent current using the supervisor 150 in operation 1010.

In operation 1020, the controller 110 may adjust a frequency of a clock signal based on the quiescent current. For example, when the electronic device 200 is absent in the wireless charging space, the controller 110 may change the frequency of the clock signal from 140 kHz to 155 kHz to reduce the quiescent current. Also, when a foreign substance is included in the wireless charging space, the controller 110 may adjust the frequency of the clock signal to adjust the quiescent current. Through this, the wireless charging apparatus 100 may prevent the foreign substance from generating heat.

When the BLE communication is possible, the controller 110 may adjust, for example, set the frequency of the clock signal to 140 kHz in operation 1030. When the electronic device 200 is present in the wireless charging space, the electronic device 200 may transmit, for example, an ACK signal to the wireless charging apparatus 100. In this example, the controller 110 may adjust the frequency of the clock signal to 140 kHz to perform charging.

When the frequency of the clock signal is adjusted to 140 kHz, the controller 110 may perform the charging on the electronic device 200 through the transmitter 130 in operation 1040.

Hereinafter, a result of evaluation of the wireless charging system 10 will be described.

Figure 10:
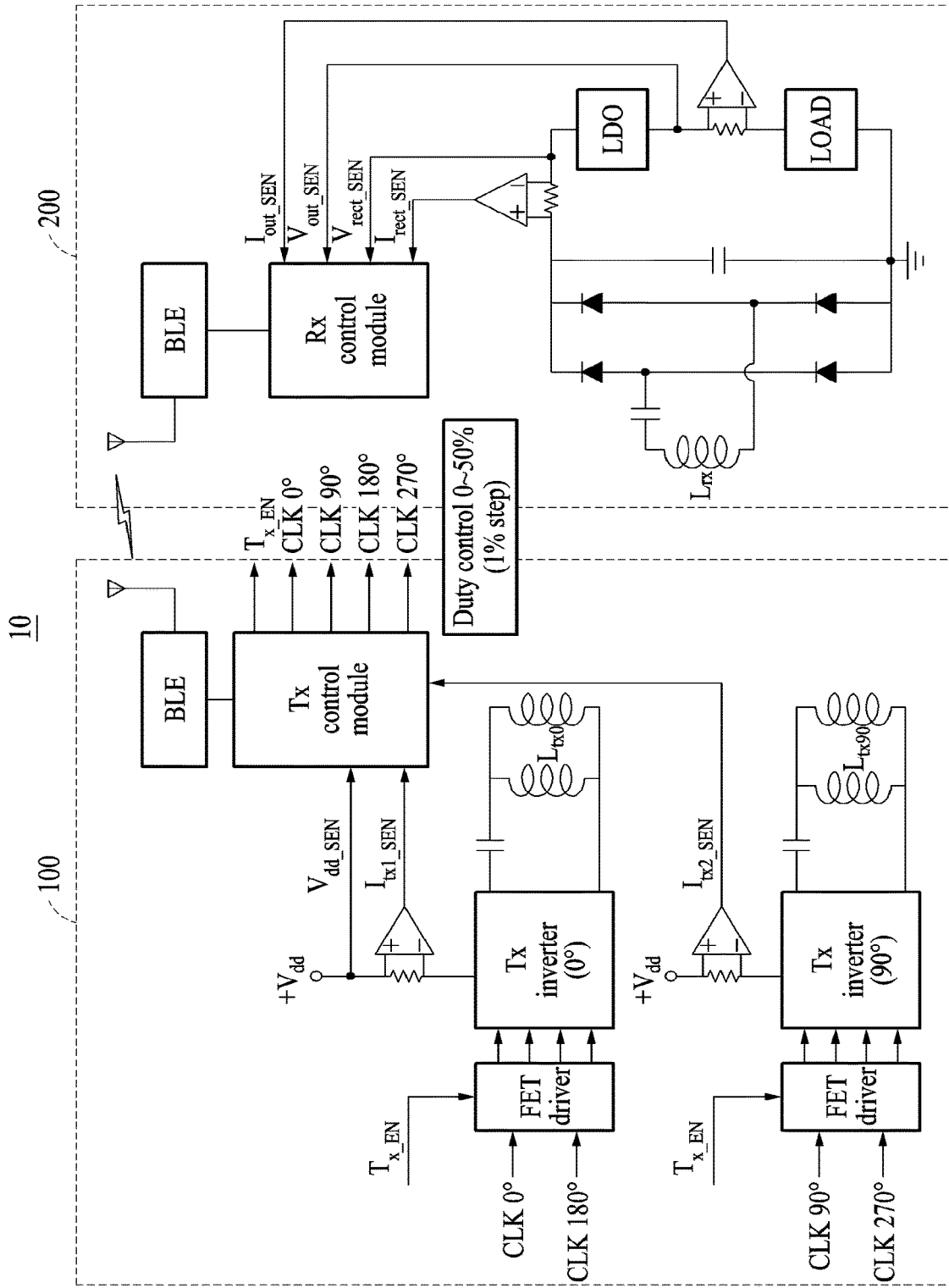
FIG. 10 is a diagram illustrating an operation of a wireless charging apparatus adjusting a duty ratio and adjusting a quiescent current according to an example embodiment.

FIG. 10 is a diagram illustrating an operation of a wireless charging apparatus adjusting a duty ratio and adjusting a quiescent current according to an example embodiment.

Referring to FIG. 10, a transmitting inverter may be a full bridge-type inverter corresponding to a switching amplifier that is operable at a frequency band of 140 kHz. Also, two transmitting inverters may be used to acquire a phase difference and four transmitting coils may be identical to one another and arranged in parallel.

In this example, a series capacitor may be additionally used to reduce a size of a transmitting coils or a resonance frequency. A capacity of the series capacitor may be set to 125 kHz that is less than a used frequency, 140 kHz. When a frequency is set to be greater than 140 kHz, unnecessary power consumption may occur in a standby state. 125 kHz may be an experimentally selected value of a frequency that maintains efficiency with a minimum quiescent current.

The wireless charging system 10 may be controlled through an out-band communication using a BLE module. In the wireless charging system 10, a voltage and a current of a transmitter-and-receiver may be monitored and a duty ratio may be adjusted in a control module or a controller such that a transmission output is appropriately controlled. In a standby mode, a clock signal having a frequency greater than 140 kHz may be generated in a control module including a clock signal generator so as to minimize a quiescent current. A signal Tx_EN may be used in the BLE module in response to a beacon signal being generated.

The electronic device 200 may include a full bridge-type rectifier circuit. In this example, voltages and currents at a point after a smoothing capacitor and a point after a low-dropout (LDO) regulator may be monitored to provide information to a radio frequency (RF) control module. Also, the electronic device 200 may be equipped with a function of protecting the circuit by cutting off a power supply in a case of overloading or excessive heat.

To evaluate an actual system, a measurement may be performed based on a DC-to-DC efficiency. A system efficiency may be expressed using Equation 2 as below.

$$\text{Eff}[\%] = (V\text{out\_SEN} * I\text{out\_SEN}) / [V\!dd\_\text{SEN} * (I tx1\_\text{SEN} + I tx2\_\text{SEN})] * 100$$

Figure 11:
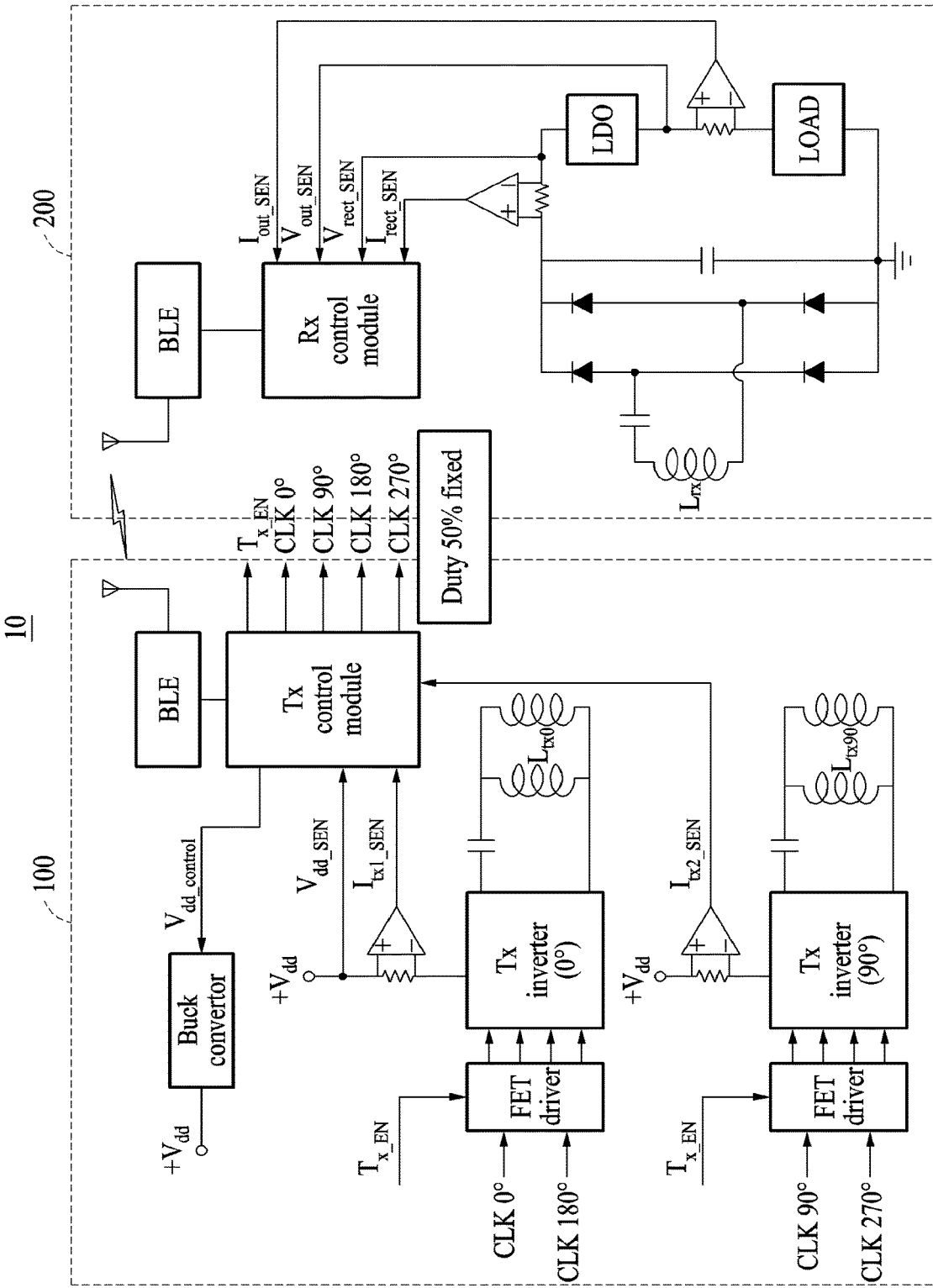
FIG. 11 is a diagram illustrating an operation of a wireless charging apparatus adjusting an amount of input power and adjusting a quiescent current according to an example embodiment.

FIG. 11 is a diagram illustrating an operation of a wireless charging apparatus adjusting an amount of input power and adjusting a quiescent current according to an example embodiment.

Referring to FIG. 11, the wireless charging apparatus 100 may adjust a voltage $V_{dd}$ supplied to a transmitting inverter. In this example, the wireless charging apparatus 100 may adjust the voltage $V_{dd}$ to be in a range between 0 V and 12 V using a buck converter. By using the buck converter, the wireless charging apparatus 100 may achieve a simplicity in implementing a control module.

Figure 12:
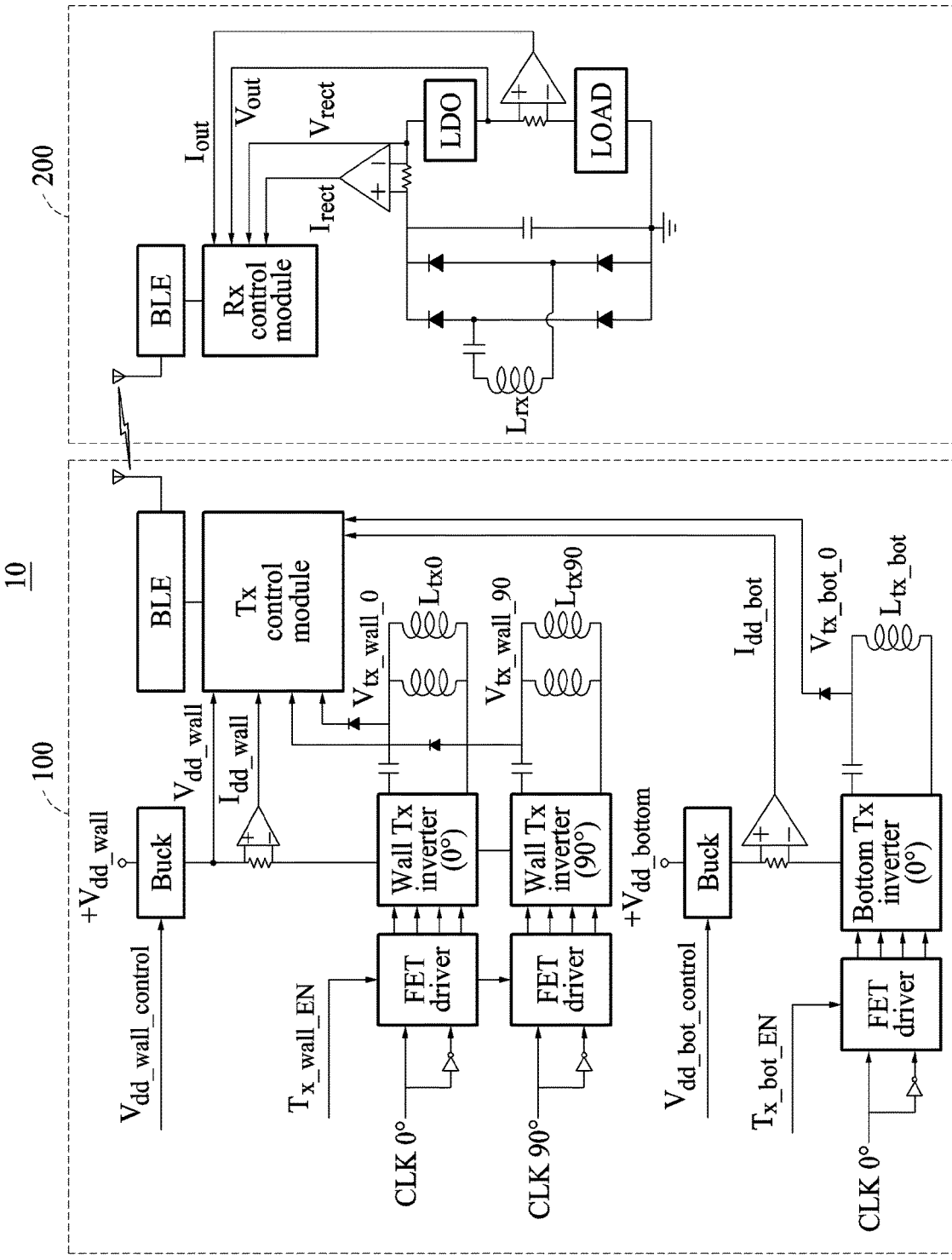
FIG. 12 is a diagram illustrating an operation of a wireless charging apparatus including a third coil on a bottom face to form a magnetic field in a wireless charging space according to an example embodiment.

FIG. 12 is a diagram illustrating an operation of a wireless charging apparatus including a third coil on a bottom face to form a magnetic field in a wireless charging space according to an example embodiment.

Referring to FIG. 12, the wireless charging apparatus 100 may also perform charging when the electronic device 200 is laid on a floor. A transmitting coil for floor, for example, a third coil may require relatively low inductance and Q value. The wireless charging apparatus 100 may monitor currents and voltages of the floor and wall to activate or enable an inverter of an actually operating transmitting coil and inactivate or disable an inverter of an unused transmitting coil. Through this, the wireless charging apparatus 100 may increase a system efficiency.

To adjust an output of the transmitter 130, the wireless charging apparatus 100 may use a method of controlling a duty ratio and/or a method of controlling a voltage $V_{dd}$. For example, the wireless charging apparatus 100 may recognize an output situation by monitoring an envelope of a voltage applied to a transmitting coil.

A transmitting coil and a receiving coil may include a shielding ferrite on a rear side, and the transmitting coil for floor may be provided in a 2-layer structure to increase a value of inductance in a limited area.

A result of evaluation of the wireless charging apparatus 100 described with reference to FIG. 12 may be represented by Table 2 through Table 5. Results of evaluating performances may be as shown in Table 2 through Table 5. Table 2 represents properties of transmitting coils on a wall. Table 3 represents properties of transmitting coils connected in parallel on walls. Table 4 represents properties of a transmitting coil on a floor. Table 5 represents properties of a receiving coil in an electronic device.

TABLE 2

| @140 kHz | L(uH) | Q | R(mOhm) | turn/layer |
|---|---|---|---|---|
| Tx_1 | 52.8 | 554 | 84.2 | 19/1 |
| Tx_2 | 52.5 | 571 | 78.2 | 19/1 |
| Tx_3 | 53.9 | 566 | 84.8 | 19/1 |
| Tx_4 | 53.5 | 551 | 81.8 | 19/1 |

TABLE 3

| @140 kHz | L(uH) | Q | C(nF) | R(mOhm) | turn/layer |
|---|---|---|---|---|---|
| Side(Tx_1-3) | 25.8 | 383 | 62.8 | 60 | 19/1 |
| Side(Tx_2-4) | 24.6 | 396 | 65.9 | 55.5 | 19/1 |

TABLE 4

| @140 kHz | L(uH) | Q | C(nF) | R(mOhm) | turn/layer |
|---|---|---|---|---|---|
| Bottom | 42.9 | 207 | 37.8 | 80 | 11/2 |

TABLE 5

| @140 kHz | L(uH) | Q | C(nF) | R(mOhm) | turn/layer |
|---|---|---|---|---|---|
| Rx | 26.5 | 180 | 48.8 | 129.6 | 1/1 |

Table 6 represents data measured for each case by monitoring an input voltage and an input current of a transmitter and an output voltage and an output current of a receiving coil based on a battery charging capacity of the electronic device 200 when charging the electronic device 200 using the wireless charging apparatus 100. As a result of the measuring, in a state in which a final output voltage of the receiving coil is maintained at 1.0 ampere (A) at the maximum, a uniform wireless charging efficiency may be generally achieved irrespective of a change in a load resistance of the receiving coil based on a change in the battery charging capacity.

TABLE 6

| Batt.(%) | Vrect (V) | Irect (mA) | Vout(V) | Iout(A) | Vin(V) | Iin(A) | Eff[%] |
|---|---|---|---|---|---|---|---|
| 15 | 5.91 | 790 | 4.68 | 1 | 7.090 | 1.018 | 64.8 |
| 20 | 5.91 | 780 | 4.67 | 1 | 7.144 | 1.024 | 63.8 |
| 25 | 5.92 | 740 | 4.69 | 1 | 7.131 | 1.020 | 64.5 |
| 30 | 5.91 | 717 | 4.68 | 1 | 7.132 | 1.022 | 64.2 |
| 35 | 5.92 | 710 | 4.68 | 1 | 7.127 | 1.023 | 64.2 |
| 40 | 5.91 | 677 | 4.68 | 1 | 7.108 | 1.020 | 64.6 |
| 45 | 5.91 | 971 | 4.68 | 1 | 7.112 | 1.020 | 64.5 |
| 50 | 5.91 | 655 | 4.68 | 1 | 7.112 | 1.020 | 64.5 |
| 55 | 5.91 | 655 | 4.68 | 1 | 7.110 | 1.021 | 64.5 |
| 60 | 5.78 | 669 | 4.60 | 1 | 7.004 | 1.010 | 65.0 |
| 65 | 5.85 | 677 | 4.65 | 1 | 7.064 | 1.017 | 64.7 |
| 70 | 5.89 | 670 | 4.65 | 1 | 7.092 | 1.012 | 64.8 |
| 75 | 5.91 | 670 | 4.70 | 1 | 7.111 | 1.014 | 65.2 |
| 80 | 5.95 | 687 | 4.74 | 1 | 7.165 | 1.022 | 64.7 |
| 85 | 6.02 | 680 | 4.80 | 1 | 7.201 | 1.023 | 65.2 |
| 90 | 6.07 | 678 | 4.84 | 1 | 7.230 | 1.023 | 65.4 |
| 92 | 6.30 | 618 | 4.86 | 1 | 7.372 | 1.001 | 65.9 |
| 94 | 6.68 | 564 | 4.86 | 0.954 | 7.517 | 0.964 | 64.0 |
| 95 | 6.70 | 550 | 4.86 | 0.945 | 7.519 | 0.958 | 63.8 |
| 97 | 6.78 | 500 | 4.86 | 0.900 | 7.346 | 0.919 | 64.8 |
| 100 | 7.10 | 400 | 4.86 | 0.790 | 7.511 | 0.830 | 61.6 |
| Charging Completed | 7.84 | 320 | 4.86 | 0.317 | 7.426 | 0.467 | 44.4 |

Figure 13:
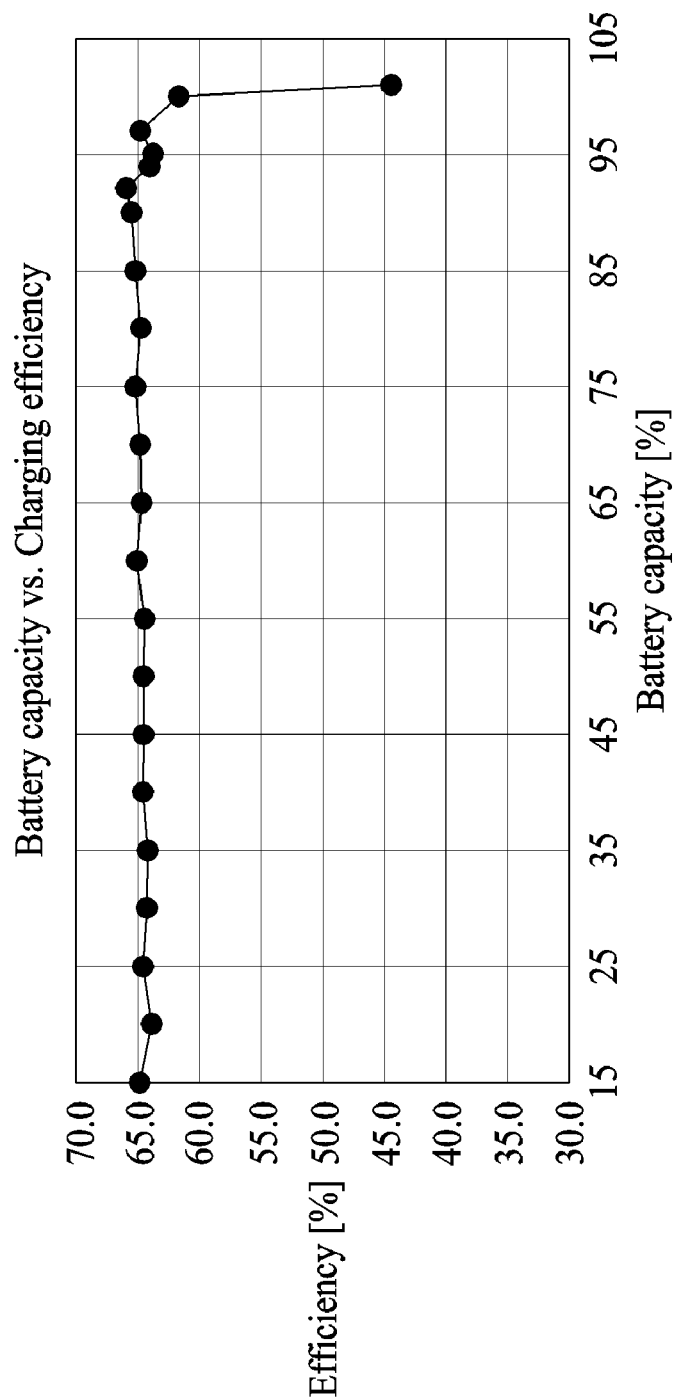
FIG. 13 is a diagram illustrating a charging efficiency based on a capacity of a battery according to an example embodiment.

Table 6 may also be represented by a graph as illustrated in FIG. 13.

FIG. 13 is a diagram illustrating a charging efficiency based on a capacity of a battery according to an example embodiment.

Referring to FIG. 13, the wireless charging apparatus 100 may maintain a predetermined efficiency until the battery is fully charged to reach 100%.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless charging apparatus comprising:
a controller configured to control the wireless charging apparatus; and
a transmitter configured to form a uniform magnetic field in a three-dimensional (3D) space based on a control of the controller,
wherein the controller is configured to change a phase of a current supplied to the coil of the transmitter,
wherein the transmitter includes first coils and second coils consisting of a pair of coils,
wherein a pair of first coils faces each other, and a pair of second coils faces each other in the 3D space,
wherein the controller supplies a first current into the pair of first coils and supplies a second current into the pair of second coils, and a phase difference between the first current and the second current is 90 degree,
wherein the transmitter includes:
a first inverter configured to supply currents to first coils among the plurality of coils in response to a first clock signal and a reversed first clock signal; and
a second inverter configured to supply currents to second coils among the plurality of coils in response to a second clock signal and a reversed second clock signal.

2. The wireless charging apparatus of claim 1, wherein the first coils are arranged in a first direction in parallel and the second coils are arranged in a second direction in parallel.

3. The wireless charging apparatus of claim 1, wherein the transmitter further includes a third inverter configured to supply a current to a third coil among the plurality of coils in response to a third clock signal, and
the third coil is disposed on a bottom face of the wireless charging apparatus.

4. The wireless charging apparatus of claim 1, wherein the transmitter further includes:
a phase reverser configured to reverse a phase of the first clock signal and a phase of the second clock signal.

5. The wireless charging apparatus of claim 1, further comprising:
a clock signal generator configured to generate the first clock signal and the second clock signal.

6. The wireless charging apparatus of claim 5, wherein the controller is configured to control a clock frequency of the clock signal generator based on a quiescent current.

7. The wireless charging apparatus of claim 6, further comprising:
a supervisor configured to monitor the quiescent current.

8. The wireless charging apparatus of claim 1, wherein the controller is configured to adjust a duty ratio between the first clock signal and the second clock signal based on a quiescent current.

9. The wireless charging apparatus of claim 1, wherein the controller is configured to control a buck converter to adjust input power of the transmitter based on a quiescent current.

10. A wireless charging method performed by a wireless charging apparatus, the method comprising:
wherein the wireless charging apparatus includes a controller and a transmitter,
receiving, by the transmitter, a first clock signal and a second clock signal generated by the controller; and
forming, by the transmitter, a uniform magnetic field in a three-dimensional (3D) space,
wherein the controller is configured to change a phase of a current supplied to the coil of the transmitter,
wherein the transmitter includes first coils and second coils consisting of a pair of coils,
wherein a pair of first coils faces each other, and a pair of second coils faces each other in the 3D space,
wherein the controller supplies a first current into the pair of first coils and supplies a second current into the pair of second coils, and a phase difference between the first current and the second current is 90 degree,
wherein the forming includes:
supplying, by the transmitter, currents to first coils of the wireless charging apparatus in response to a first clock signal and a reversed first clock signal; and
supplying, by the transmitter, currents to second coils of the wireless charging apparatus in response to a second clock signal and a reversed second clock signal.

11. The wireless charging method of claim 10, wherein the first coils are arranged in a first direction in parallel and the second coils are arranged in a second direction in parallel.

12. The wireless charging method of claim 10, wherein the forming further includes supplying a current to a third coil of the wireless charging apparatus in response to a third clock signal, and
the third coil is disposed on a bottom face of the wireless charging apparatus.

13. The wireless charging method of claim 12, wherein the first coils and the second coils are arranged on a wall of the wireless charging apparatus.

14. The wireless charging method of claim 10, further comprising:
controlling, by the controller, frequencies of the first clock signal and the second clock signal based on a quiescent current.

15. The wireless charging method of claim 14, further comprising:
wherein the wireless charging apparatus includes a supervisor,
monitoring, by the supervisor, the quiescent current.

16. The wireless charging method of claim 10, further comprising:
adjusting, by the controller, a duty ratio between the first clock signal and the second clock signal based on a quiescent current.

17. The wireless charging method of claim 10, further comprising:
adjusting, by the controller, an input power input to the wireless charging apparatus based on a quiescent current.

* * * * *